(12) United States Patent
Roundy et al.

(10) Patent No.: US 10,057,274 B1
(45) Date of Patent: Aug. 21, 2018

(54) SYSTEMS AND METHODS FOR PROFILING CLIENT SYSTEMS

(71) Applicant: Symantec Corporation, Mountain View, CA (US)

(72) Inventors: Kevin Alejandro Roundy, El Segundo, CA (US); Leylya Bilge, Antibes (FR); Christopher Gates, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 196 days.

(21) Appl. No.: 15/087,623

(22) Filed: Mar. 31, 2016

(51) Int. Cl.
  *H04L 29/06* (2006.01)
  *G06F 17/30* (2006.01)
  *H04L 29/08* (2006.01)

(52) U.S. Cl.
  CPC ........ *H04L 63/105* (2013.01); *G06F 17/3053* (2013.01); *G06F 17/30598* (2013.01); *H04L 67/303* (2013.01)

(58) Field of Classification Search
  USPC .......................................................... 726/1
  See application file for complete search history.

(56) References Cited

U.S. PATENT DOCUMENTS

| | | | | |
|---|---|---|---|---|
| 2009/0222364 | A1* | 9/2009 | McGlynn | G06Q 30/02 705/30 |
| 2014/0129457 | A1* | 5/2014 | Peeler | G06Q 10/067 705/317 |
| 2015/0281277 | A1* | 10/2015 | May | H04L 63/10 726/1 |
| 2015/0324606 | A1* | 11/2015 | Grondin | H04L 63/205 726/1 |

OTHER PUBLICATIONS

Sourabh Satish; Systems and Methods for Analyzing Malware Samples; U.S. Appl. No. 14/314,031, filed Jun. 25, 2014.
Kitajima, Shinya et al., "Automatic server role identification for cloud infrastructure construction", http://ieeexplore.ieee.org/document/6710569/, as accessed Feb. 4, 2016, 2013 IEEE 2nd International Conference on Cloud Networking (CloudNet), (Nov. 11-13, 2013).
Blei, David M., et al., "Supervised topic models", https://www.cs.princeton.edu/~blei/papers/BleiMcAuliffe2007.pdf, as accessed Feb. 4, 2016, (2007).

* cited by examiner

*Primary Examiner* — Brandon S Hoffman
(74) *Attorney, Agent, or Firm* — FisherBroyles, LLP

(57) ABSTRACT

The disclosed computer-implemented method for profiling client systems may include (1) identifying one or more administrative categories used to categorize clients according to system profiles of the clients, (2) collecting attribute information that associates one or more client attributes with the administrative category, (3) generating, based at least in part on the association between the client attribute and the administrative category, an association scoring protocol that estimates an association strength between clients and the administrative category, (4) assigning, based on the association scoring protocol, an association score to one or more clients, (5) determining, based on the association score being above a threshold, that the client should be associated with the administrative category, and (6) initiating one or more customized administrative actions for the client, based at least in part by the association of the client with the administrative category. Various other methods, systems, and computer-readable media are also disclosed.

20 Claims, 7 Drawing Sheets

SYSTEMS AND METHODS FOR PROFILING CLIENT SYSTEMS

BACKGROUND

Effectively administering computer administrative policies often involves tailoring policies for a particular user, set of applications, or computing system. Individual users or groups of users may require access to different data files, databases, or applications. System administrators may, for example, use network analysis software, but the presence of a network analysis tools on an accounting department computer system may represent a security threat. Application user interfaces and system administration messages may be tailored to the needs and/or technical sophistication of different types of users.

Customizing administrative policies for various categories of computing systems may involve collecting and collating large quantities of data about network activity, running processes, files and applications present on or accessed by computing systems, etc. Computing systems with similar attributes may be grouped in a common administrative category, for which administrators may develop a customized administrative policy. Unfortunately, in many cases a systems analyst may not be aware of the computing system attributes that indicate systems should belong to the same administrative category, or even what administrative categories may exist in an organization's computing systems. Accordingly, the instant disclosure identifies and addresses a need for additional and improved systems and methods for profiling client systems.

SUMMARY

As will be described in greater detail below, the instant disclosure describes various systems and methods for profiling client systems by identifying client administrative categories and assigning client computing systems to administrative categories, based on attributes of the client systems, such as files, applications, network activity, and/or running processes. The disclosed systems and methods may use statistical methods to create groups of client systems that have the most attributes in common. The disclosed systems and methods may also identify client systems that, based on common attributes, may be grouped in previously unidentified administrative categories. Classifying client systems into administrative categories with common attributes provides a basis for developing administrative policies and/or initiating administrative actions that are better targeted to the administrative needs associated with each client system. Client system profiling may have applications in developing security policies, capacity planning, resource allocation, system maintenance and upgrade planning, etc.

In one example, a computer-implemented method for profiling client systems may include (1) identifying one or more administrative categories used to categorize clients according to system profiles of the clients, (2) collecting attribute information that associates one or more client attributes with the administrative category, (3) generating, based at least in part on the association between the client attribute and the administrative category, an association scoring protocol that estimates an association strength between clients and the administrative category, (4) assigning, based on the association scoring protocol, an association score to one or more clients, (5) determining, based on the association score being above a threshold, that the client should be associated with the administrative category, and (6) initiating one or more customized administrative actions for the client, based at least in part by the association of the client with the administrative category.

In some examples, collecting attribute information that associates the client with the administrative category may include (1) identifying at least one client attribute that associates clients with the administrative category, (2) assigning, based on the identified client attribute, at least one client to the administrative category, and (3) identifying additional attribute information associated with the client. In some examples, collecting attribute information that associates the client with the administrative category may include identifying at least one client attribute that associates clients with the administrative category and identifying additional attribute information associated with the client attribute. In one embodiment, the attribute information may include one or more files present on the client, one or more processes running on the client, one or more network connections established by the client, data accessed by the client, and/or network traffic generated by the client.

In some examples, generating the association scoring protocol that estimates the association strength between clients and the administrative category may include (1) identifying a set of clients associated with the administrative category, (2) identifying one or more attributes of the set of clients that most strongly correlate with membership in the set of clients, and (3) based on the strength of the correlation between the attribute and membership in the set of clients, estimating the association strength between membership in the set of clients and the administrative category. In some examples, generating the association scoring protocol that estimates the association strength between clients and the administrative category may include (1) assigning a group of clients with one or more common attributes to the administrative category, (2) identifying one or more additional attributes of one or more clients in the group of clients, (3) determining a correlation strength between the additional attribute and membership in the administrative category, and (4) based on the correlation strength between the additional attribute and membership in the administrative category, estimating the association strength between membership in the group of clients and the administrative category.

In some examples, the computer-implemented method may further include identifying an additional administrative category by (1) determining that the additional attribute weakly correlates with membership in the administrative category, (2) determining that the additional attribute strongly correlates with membership in a subset of the clients, and (3) assigning the subset of the clients to the additional administrative category. In one embodiment, the customized administrative action may include (1) identifying a trusted application source for the client, (2) identifying a trusted application update source for the client, (3) modifying one or more client application user interfaces, (4) assigning a security alert policy to the client, (5) assigning a data access policy to the client, (6) assigning a messaging policy to the client, and/or (7) notifying an administrator of the administrative category association for the client.

In one embodiment, a system for implementing the above-described method may include several modules stored in memory, such as (1) an identification module that identifies one or more administrative categories used to categorize clients according to system profiles of the clients, (2) a collection module that collects attribute information that associates one or more client attributes with the administrative category, (3) a correlation module that generates, based at least in part on the association between the client attribute and the administrative category, an association scoring protocol that estimates an association strength between clients and the administrative category, (4) a scoring module that assigns, based on the association scoring protocol, an association score to one or more clients, (5) a categorization module that determines, based on the association score being above a threshold, that the client should be associated with the administrative category, and/or (6) an administration module that initiates one or more customized administrative actions for the client, based at least in part by the association of the client with the administrative category. The system may also include at least one physical processor configured to execute the identification module, the collection module, the correlation module, the scoring module, the categorization module, and the administration module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify one or more administrative categories used to categorize clients according to system profiles of the clients, (2) collect attribute information that associates one or more client attributes with the administrative category, (3) generate, based at least in part on the association between the client attribute and the administrative category, an association scoring protocol that estimates an association strength between clients and the administrative category, (4) assign, based on the association scoring protocol, an association score to one or more clients, (5) determine, based on the association score being above a threshold, that the client should be associated with the administrative category, and (6) initiate one or more customized administrative actions for the client, based at least in part by the association of the client with the administrative category.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
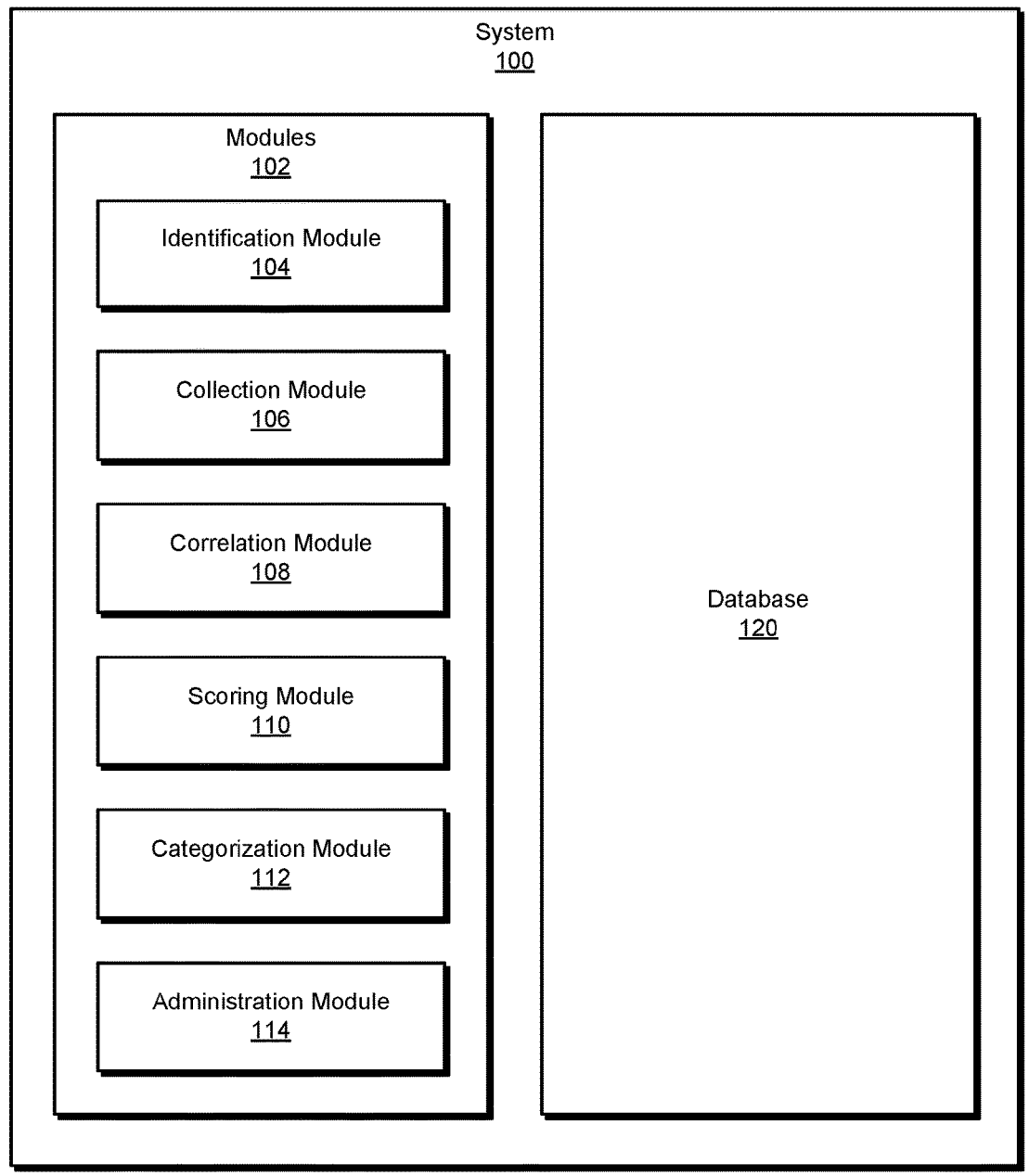
FIG. 1 is a block diagram of an exemplary system for profiling client systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for profiling client systems. As will be explained in greater detail below, the systems and methods described herein may group client systems with similar attributes into administrative categories. By applying statistical methods to identify groups of client systems with similar attributes, the systems and methods described herein may facilitate development of administrative policies that are customized to the particular needs of each client system. The systems and methods described herein may analyze a large quantity of client attribute data for many client systems and accurately group client systems in administrative categories, allowing system administrators to focus on developing custom administrative policies for systems assigned to each administrative category, instead of performing time-consuming analytics. In cases where appropriate administrative categories are not known beforehand, the systems and methods described herein may identify groups of client systems with similar attributes that represent a previously unidentified administrative category.

The following will provide, with reference to FIGS. 1, 2, 4, and 5, detailed descriptions of exemplary systems for profiling client systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for profiling client systems. As illustrated in this figure, exemplary system 100 may include one or more modules 102 for performing one or more tasks. For example, and as will be explained in greater detail below, exemplary system 100 may include an identification module 104 that identifies one or more administrative categories used to categorize clients according to system profiles of the clients. Exemplary system 100 may additionally include a collection module 106 that collects attribute information that associates one or more client attributes with the administrative category. Exemplary system 100 may also include a correlation module 108 that generates, based at least in part on the association between the client attribute and the administrative category, an association scoring protocol that estimates an association strength between clients and the administrative category. Exemplary system 100 may additionally include a scoring module 110 that assigns, based on the association scoring protocol, an association score to one or more clients. Exemplary system 100 may also include a categorization module 112 that determines, based on the association score being above a threshold, that the client should be associated with the administrative category. Exemplary system 100 may additionally include an administration module 114 that initiates one or more customized administrative actions for the client, based at least in part by the association of the client with the administrative category. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store client computing system data, administrative category data, and/or security policy data. Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
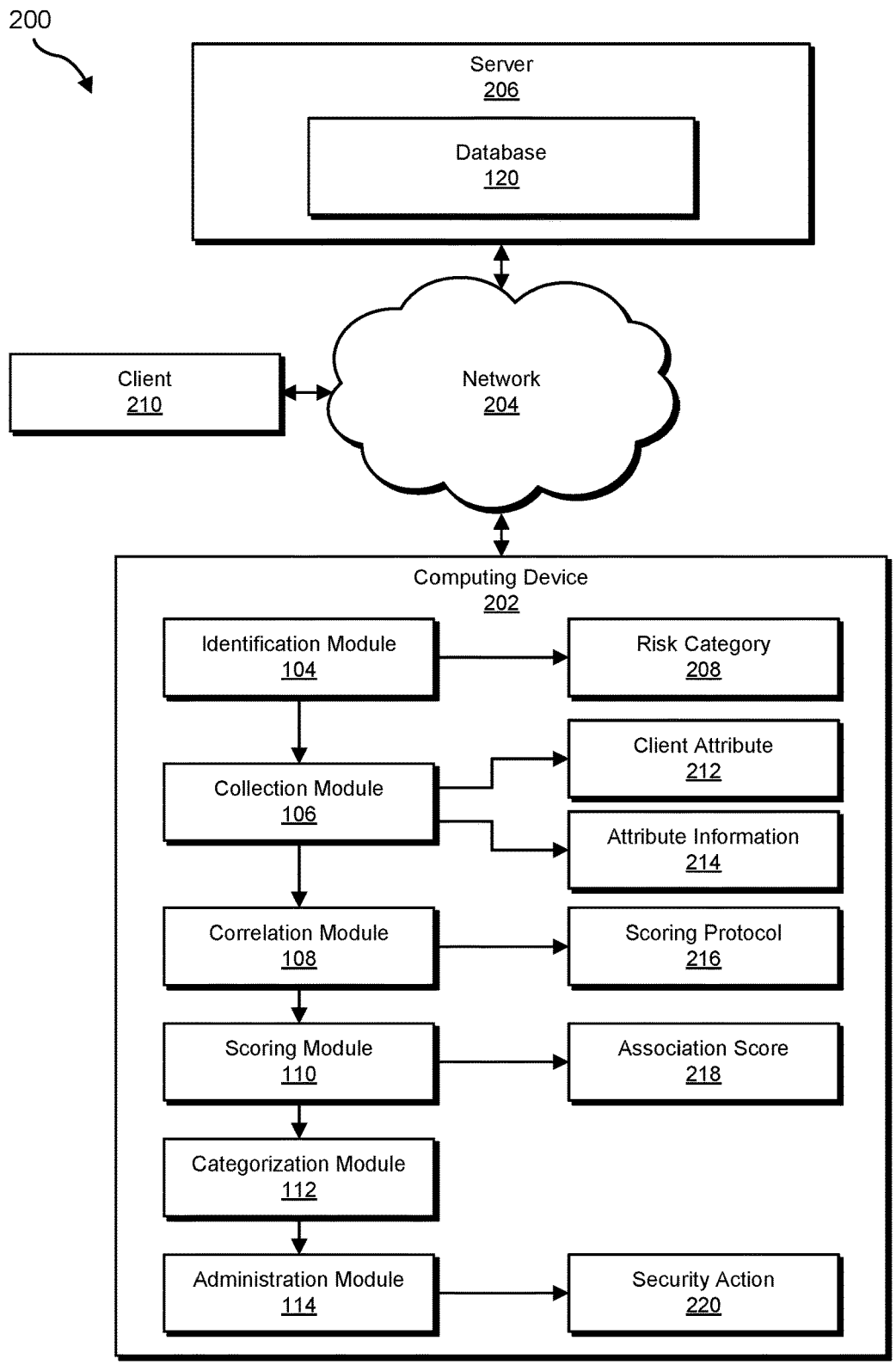
FIG. 2 is a block diagram of an additional exemplary system for profiling client systems.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to profile client systems. For example, and as will be described in greater detail below, one or more of modules 102 may cause computing device 202 and/or server 206 to profile client systems. For example, and as will be described in greater detail below, identification module 104 may identify one or more administrative categories 208 used to categorize clients according to system profiles of the clients. Collection module 106 may collect attribute information 214 that associates one or more client attributes 212 with administrative category 208. Correlation module 108 may generate, based at least in part on the association between client attribute 212 and administrative category 208, an association scoring protocol 216 that estimates an association strength between clients and administrative category 208. Scoring module 110 may assign, based on association scoring protocol 216, an association score 218 to one or more clients 210. Categorization module 112 may determine, based on association score 218 being above a threshold, that client 210 should be associated with administrative category 208. Administration module 114 may initiate one or more customized administrative actions 220 for client 210, based at least in part by the association of client 210 with administrative category 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of communicating, storing, and comparing data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
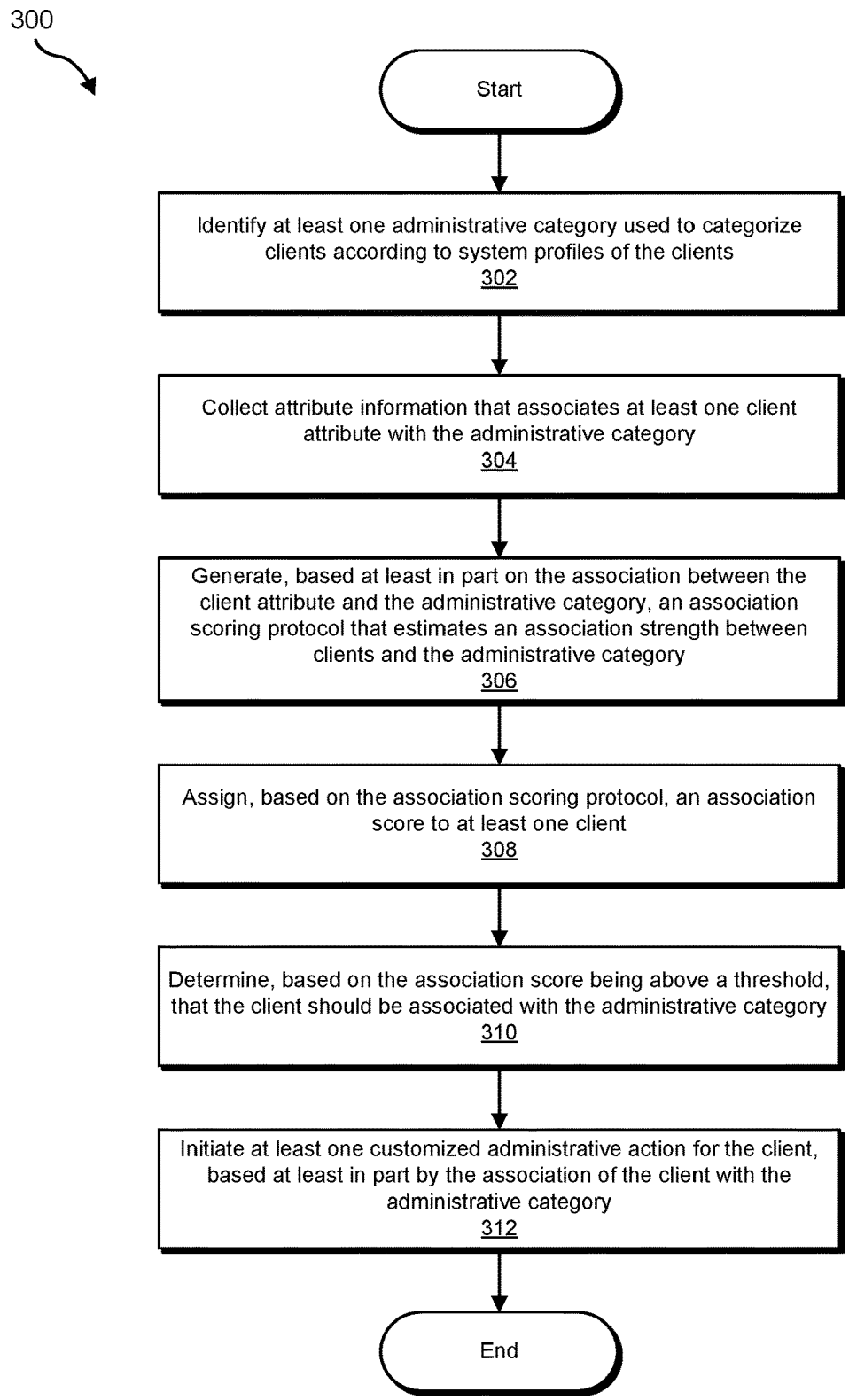
FIG. 3 is a flow diagram of an exemplary method for profiling client systems.

FIG. 3 is a flow diagram of an exemplary computer-implemented method 300 for profiling client systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify one or more administrative categories used to categorize clients according to system profiles of the clients. For example, identification module 104 may, as part of computing device 202 in FIG. 2, identify one or more administrative categories 208 used to categorize clients according to system profiles of the clients.

The term "administrative category," as used herein, generally refers to a category in which client systems may be grouped to receive similar administrative measures. For example, client systems in a human resources department may be grouped in a "personal data" administrative category as systems that may have access to personal information such as salaries, social security numbers, home addresses, etc., so that appropriate security policies for the systems may be developed and applied. In another example, client systems running particular processor-intensive applications, generating a large amount of network traffic, or exhibiting an increase in usage metrics collected over time may be grouped in an "upgrade priority" administrative category as systems to be prioritized for replacement or upgrade.

Identification module 104 may identify administrative categories in a variety of ways. For example, identification module 104 may receive descriptions of list categories from an administrator familiar with the administrative requirements of an organization. In another example, identification module 104 may assemble a list of administrative categories by analyzing network maps, existing administrative policies, and/or client system placement in a directory services hierarchy.

At step 304, one or more of the systems described herein may collect attribute information that associates one or more client attributes with the administrative category. For example, collection module 106 may, as part of computing device 202 in FIG. 2, collect attribute information 214 that associates one or more client attributes 212 with administrative category 208.

The term "attribute information," as used herein, generally refers to configuration or usage data that may associate a client system with an administrative category. For example, attribute information may include files present on the client. Files present on a client may indicate the type of applications used on the client and/or whether the user creates or accesses sensitive data on the client system. Attribute information may also include data accessed by the client, which, as with files present on the client, may indicate whether client system users access sensitive information. Attribute information may also include processes running on the client, which may also indicate applications used on the client and/or services provided by the client system. Attribute information may also include network usage information, such as network connections established by the client and/or network traffic generated by the client. Attribute information may also include usage metrics collected over a time interval to indicate trends in system usage.

Collection module 106 may collect attribute information that associates client attributes with an administrative category in a variety of ways. For example, collection module 106 may receive attribute information from an agent running on the client. Collection module 106 may also receive attribute information from security systems, such as user authentication systems, malware detection systems and/or data loss prevention systems. In another example, collection module 106 may receive attribute information from operational records and tools, such as asset inventory records, network analysis and mapping tools, usage logs, system administration records, and/or system administration tools.

In some examples, collection module 106 may collect attribute information that associates the client with the administrative category by obtaining attribute information from one or more clients that have initially been assigned to an administrative category. For example, collection module 106 may identify at least one client attribute that associates clients the administrative category. Collection module 106 may, for example, receive information that assignment to a system administrator group in a directory service associates a client with a system administrator administrative category. Collection module 106 may then identify one or more clients with the specified criteria and, based on the identified criteria, assign the clients to the administrative category. Collection module 106 may then identify additional attribute information that associates clients with the administrative category by identifying additional attribute information associated with the clients that were assigned to the administrative category. For example, collection module 106 may identify network analysis tools present on clients assigned to a system administrator administrative category.

In some examples, collection module 106 may collect attribute information that associates the client with the administrative category based on an association between a client attribute and another client attribute already associated with an administrative category, e.g., by identifying one or more client attributes that associate clients with the administrative category and identifying additional attribute information associated with the client attribute. For example, collection module 106 may receive a list of files associated with an application that associates clients with an administrative category. Collection module 106 may then collect attribute information that associates clients with the administrative category by identifying additional files associated with the application.

At step 306, one or more of the systems described herein may generate, based at least in part on the association between the client attribute and the administrative category, an association scoring protocol that estimates an association strength between clients and the administrative category. For example, correlation module 108 may, as part of computing device 202 in FIG. 2, generate, based at least in part on the association between client attribute 212 and administrative category 208, an association scoring protocol 216 that estimates an association strength between clients and administrative category 208.

The phrase "association scoring protocol," as used herein, generally refers to a heuristic or statistical method for estimating the association between a client and an administrative category, based on the correlation between the presence of a client attribute and the classification of a client to the administrative category. Correlation module 108 may generate an association scoring protocol in a variety of ways. For example, if one or more clients can initially be assigned to an administrative category, correlation module 108 may generate an association scoring protocol by (1) identifying the set of clients associated with the administrative category, (2) identifying one or more attributes of the set of clients that most strongly correlate with membership in the set of clients, and (3) estimating the association strength between the set of clients and the administrative category. Correlation module 108 may identify the top percentile of clients that most strongly represent the administrative category, with the fewest attributes that overlap with other administrative categories. Correlation module 108 may then apply a statistical classification model such as supervised Latent Dirichlet Allocation, modified to use a binomial distribution instead of a Dirichlet distribution to indicate the presence or absence of a client attribute on a client system. In this way, correlation module 108 may identify the client attributes that most strongly correlate with the administrative category.

Figure 4:
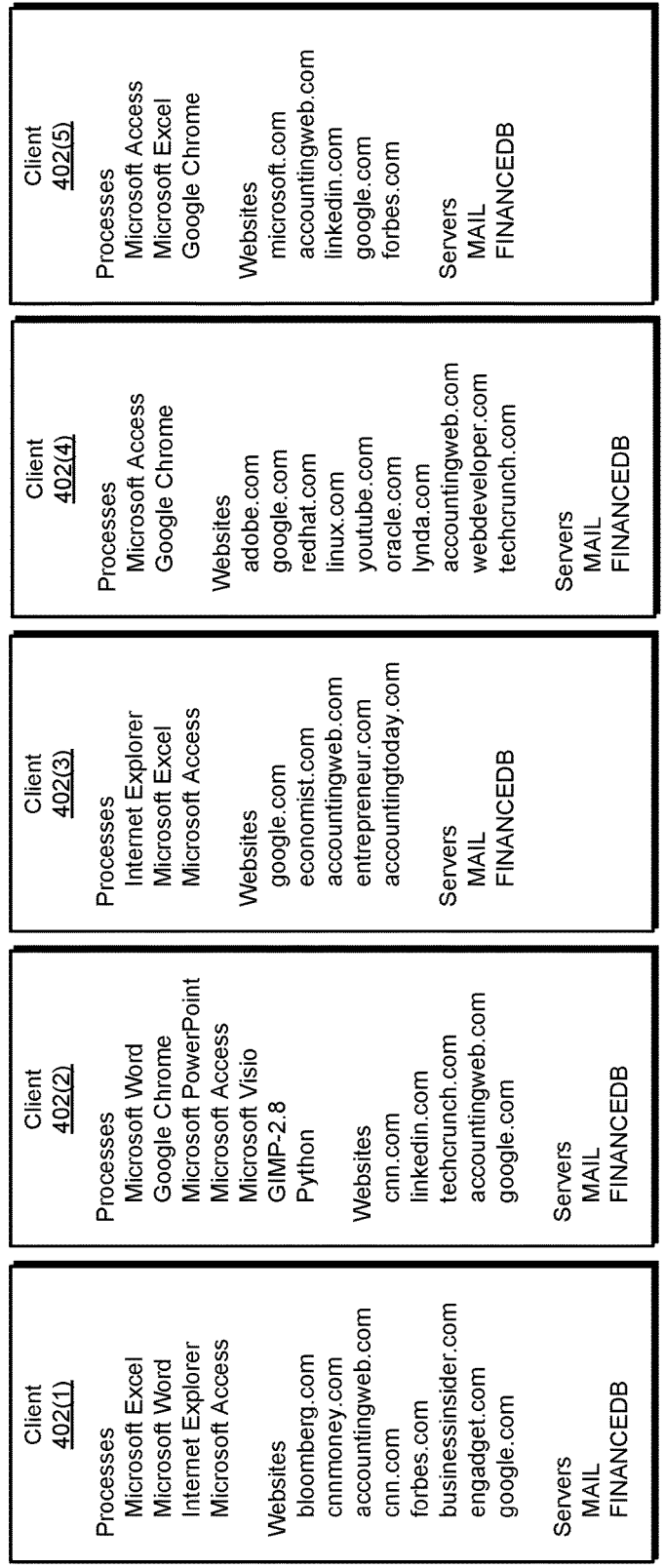
FIG. 4 is a block diagram illustrating an association between client attributes and administrative categories.

FIG. 4 is a block diagram illustrating an association between client attributes and an administrative category for a group 400 of client systems 402(1-5) in an accounting department. As shown in FIG. 4, clients 402(1-5) include process, website and server attributes for each client 402(1-5). Client attribute data may have been collected by an agent running on each client. Process attributes include applications used on each client system. For example, process attributes for client 402(3) include INTERNET EXPLORER, MICROSOFT EXCEL, and MICROSOFT ACCESS. Although each client 402(1-5) includes a unique group of process attributes, client system users have used MICROSOFT ACCESS on all clients 402(1-5). Similarly, although browser users visited different groups of websites from each client 402(1-5), users on all clients 402(1-5), accessed "accountingweb.com." All clients accessed two servers, MAIL and FINANCEDB. Further analysis may determine that client systems in other departments also access the MAIL server, but access to the FINANCEDB server is unique to clients 402(1-5) in the accounting department. Correlation module 108 may identify clients 402(1-5) as most strongly representing an administrative category of clients with access to financial data. Subsequent statistical analysis may determine that the client attributes most strongly correlated with the administrative category include executing a MICROSOFT ACCESS process, accountingweb.com website access, and FINANCEDB server access.

In some examples, correlation module 108 may generate the association scoring protocol that estimates the association strength between clients and the administrative category by first clustering client systems according to a set of common attributes, then applying classification techniques to determine the correlation between client attributes and membership in the administrative category. For example, correlation module 108 may generate the association scoring protocol by (1) assigning a set of clients with one or more common attributes to the administrative category, (2) identifying one or more additional attributes of one or more clients in the set of clients, (3) determining a correlation strength between the additional attribute and membership in the administrative category, and (4) estimating the association strength between the set of clients and the administrative category. Correlation module 108 may apply a classification technique such as naïve Bayes to determine the extent to which client attributes predict membership of a client to an administrative category.

Figure 5:
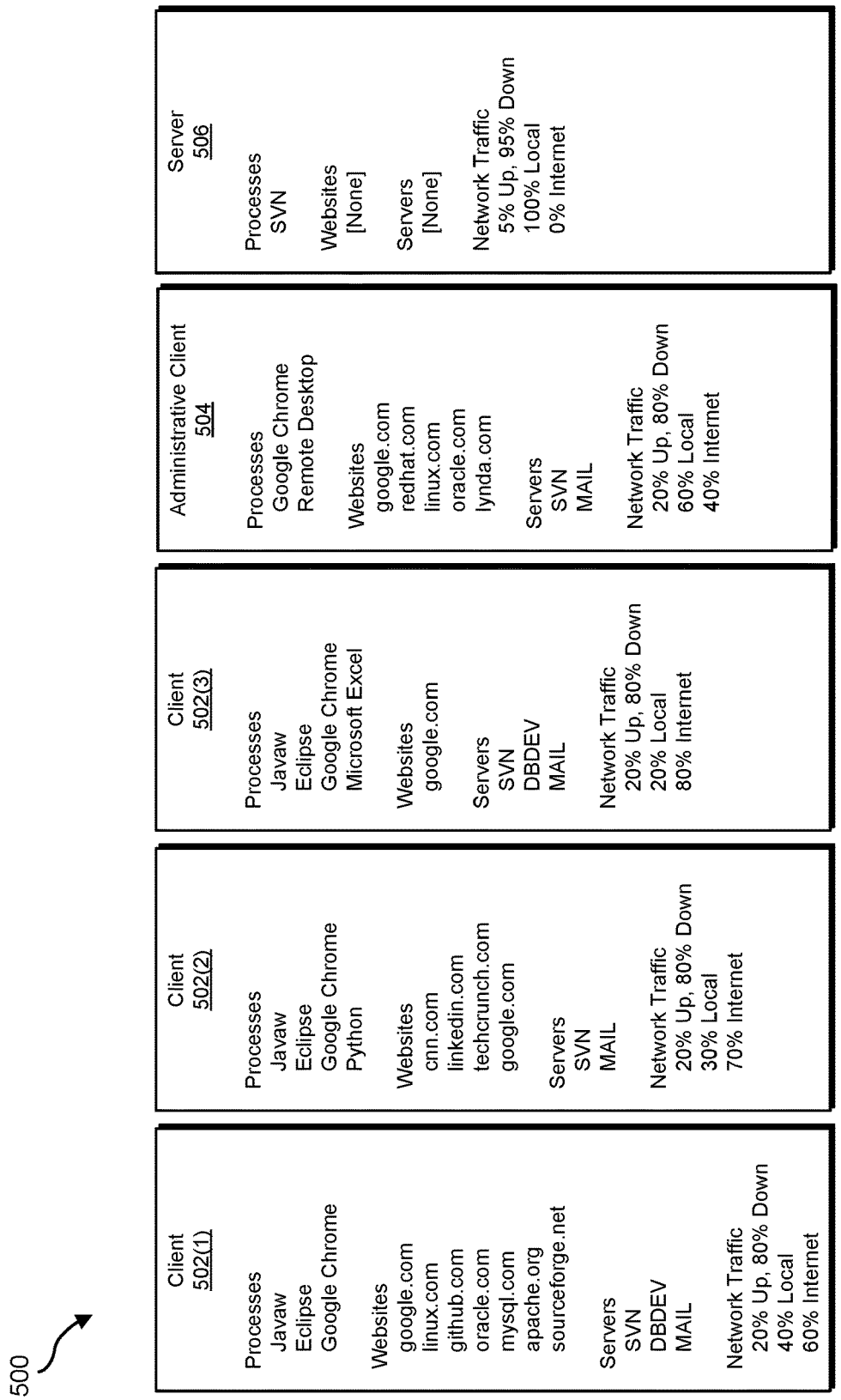
FIG. 5 is a block diagram illustrating an association between client attributes and administrative categories.

FIG. 5 is a block diagram illustrating an association between client attributes and an administrative category for a group 500 of client systems in an engineering department. The group of client systems may include clients 502(1-3), administrative client 504, and server 506, each with client attributes indicating running processes, websites visited, servers accessed, and a summary of network traffic to and from the client system. Correlation module 108 may determine that clients 502(1-3) may be grouped in an administrative category of systems with access to engineering data, based on each of clients 502(1-3) running JAVAW and ECLIPSE processes. Correlation module 108 may then determine that administrative client 504 may also be included in the engineering data access administrative category because, like clients 502(1-3), administrative client 504 accesses the SVN server. Correlation module 108 may also determine that because server 506 has no attributes in common with the other systems, server 506 may be grouped in a separate administrative category.

At step 308, one or more of the systems described herein may assign, based on the association scoring protocol, an association score to one or more clients. For example, scoring module 110 may, as part of computing device 202 in FIG. 2, assign, based on the association scoring protocol 216, association score 218 to one or more clients 210.

Scoring module 110 may assign an association score to a client in a variety of ways. For example, scoring module 110 may assign an association score to a client previously unassigned to an administrative category, based on client attribute information acquired from the client. Scoring module 110 may, for example, assign the client a correlation coefficient based on a composite of statistical correlations between client attributes and membership in one or more administrative categories. Scoring module 110 may, for example, express an association score as a percentage or a value between zero and one.

At step 310, one or more of the systems described herein may determine, based on the association score being above a threshold, that the client should be associated with an administrative category. For example, categorization module 112 may, as part of computing device 202 in FIG. 2, determine, based on association score 218 being above a threshold, that client 210 should be associated with administrative category 208.

Categorization module 112 may determine whether the client should be associated with the administrative category in a variety of ways. For example, categorization module 112 may compare association scores assigned to the client for one or more administrative categories by scoring module 110, as described in step 308 above. Categorization module 112 may determine to which of several administrative categories the client should be assigned by determining to which administrative category scoring module 110 has assigned the client the greatest association score. In another example, categorization module 112 may determine that the client may be assigned to more than one administrative category, based on categorization module 112 assigning the client an association score above a threshold value for each administrative category. For example, categorization module 112 may assign a client to each of several administrative categories if the client's association score for the administrative category is above 80 percent.

In some examples, systems described herein may identify an additional administrative category by determining that a group of client systems include a common set of attributes, but do not strongly correlate with an existing administrative category. For example, categorization module 112 may identify an additional administrative category by first determining that a client attribute weakly correlates with membership in existing administrative categories. Categorization module 112 may then determine that the presence of the attribute on a client system strongly correlates with membership in a subset of client systems. Categorization module 112 may then create a new administrative category that includes the subset of client systems.

At step 312, one or more of the systems described herein may initiate one or more customized administrative actions for the client, based at least in part by the association of the client with the administrative category. For example, administration module 114 may, as part of computing device 202 in FIG. 2, initiate one or more customized administrative actions 220 for client 210, based at least in part by the association of client 210 with administrative category 208.

Administration module 114 may initiate a variety of administrative actions, customized to the particular needs of clients in each administrative category. For example, a set of software applications associated with an administrative category may represent a potential security vulnerability, which administration module 114 may address by identifying trusted application or application update sources, or by initiating a more intensive risk assessment for clients in the administrative category. In another example, administration module 114 may modify one or more client application user interfaces according to the needs of client users in the administrative category. For example, administration module 114 may select or prioritize help or alert messages appropriate to the technical sophistication of users of client systems in an administrative category.

In another example of a customized administrative action, administration module 114 may initiate a targeted marketing campaign that directs customized marketing messages according to a client's administrative category assignment. For example, administration module 114 may direct targeted marketing messages to users with client administrative category assignments that indicate they use particular software applications or access particular websites. Additionally, administration module 114 may initiate customized administrative actions such as assigning an application use, data access, or security alert policy to a client or notifying an administrator of the administrative category association for a client.

Administration module 114 may initiate customized administrative actions in a variety of ways. For example, administration module 114 may provide administrative category client membership information to one or more client security services, such as a data loss prevention service, malware prevention service, etc. In another example, administration module 114 may provide administrative category client membership information to client system administrators for development of customized administrative actions for each administrative category. In another example, administration module 114 may provide administrative category client membership information to a network directory service, which may associate security policies with clients assigned to each administrative category.

As described in greater detail above, the systems and methods described herein may profile client systems by identifying client administrative categories, associating clients with the administrative categories, and generating a scoring protocol that applies statistical methods to assign client systems to the identified administrative categories. The systems and methods described herein may then assign association scores to client systems, based on the scoring protocol, and then assign client systems to administrative categories, based on the association scores. Additionally, the systems and methods described herein may identify groups of client systems with similar attributes that may represent a previously unidentified administrative category. Once client systems have been assigned to administrative categories, the systems and methods described herein may initiate customized administrative actions for clients in each administrative category.

Figure 6:
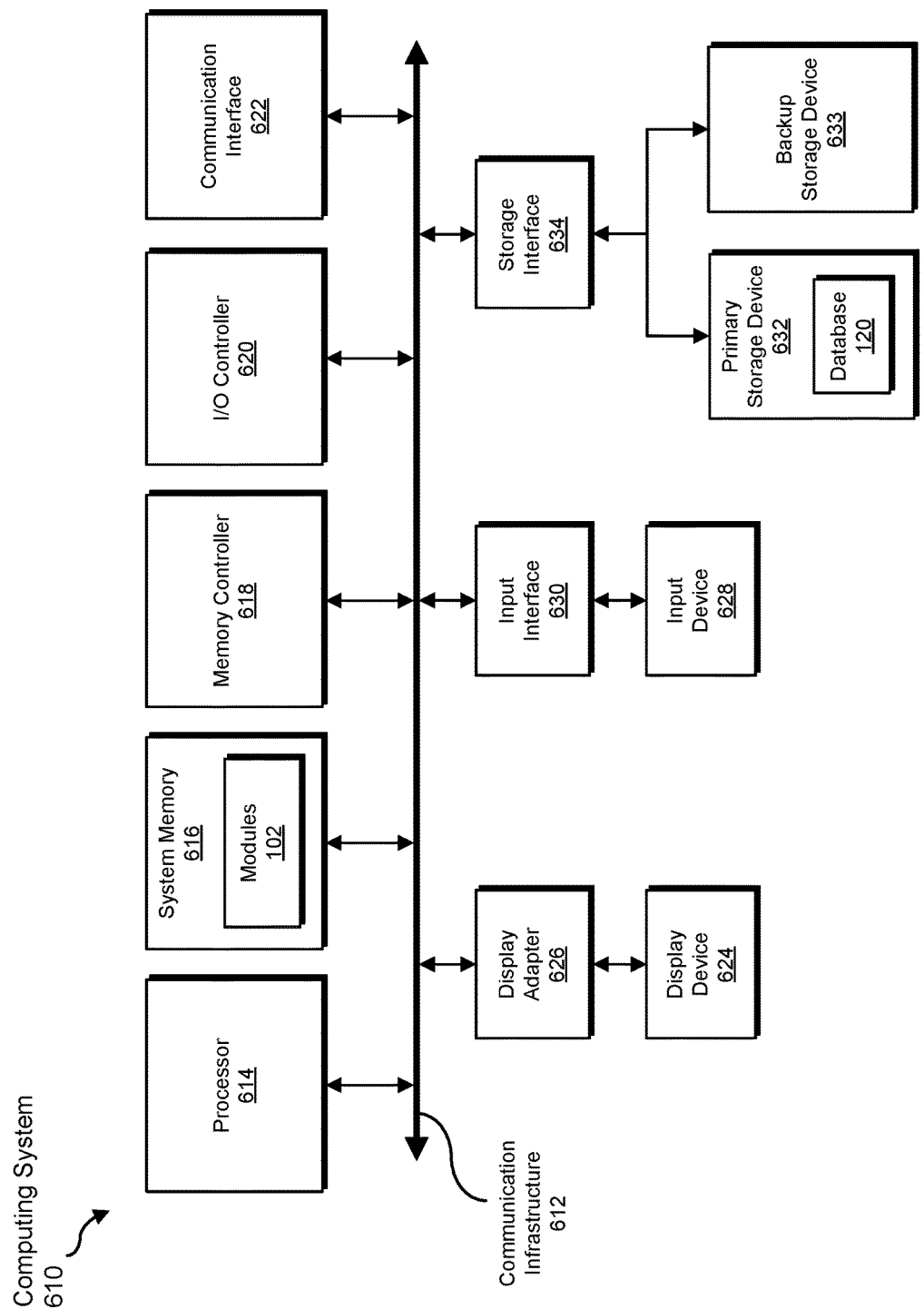
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
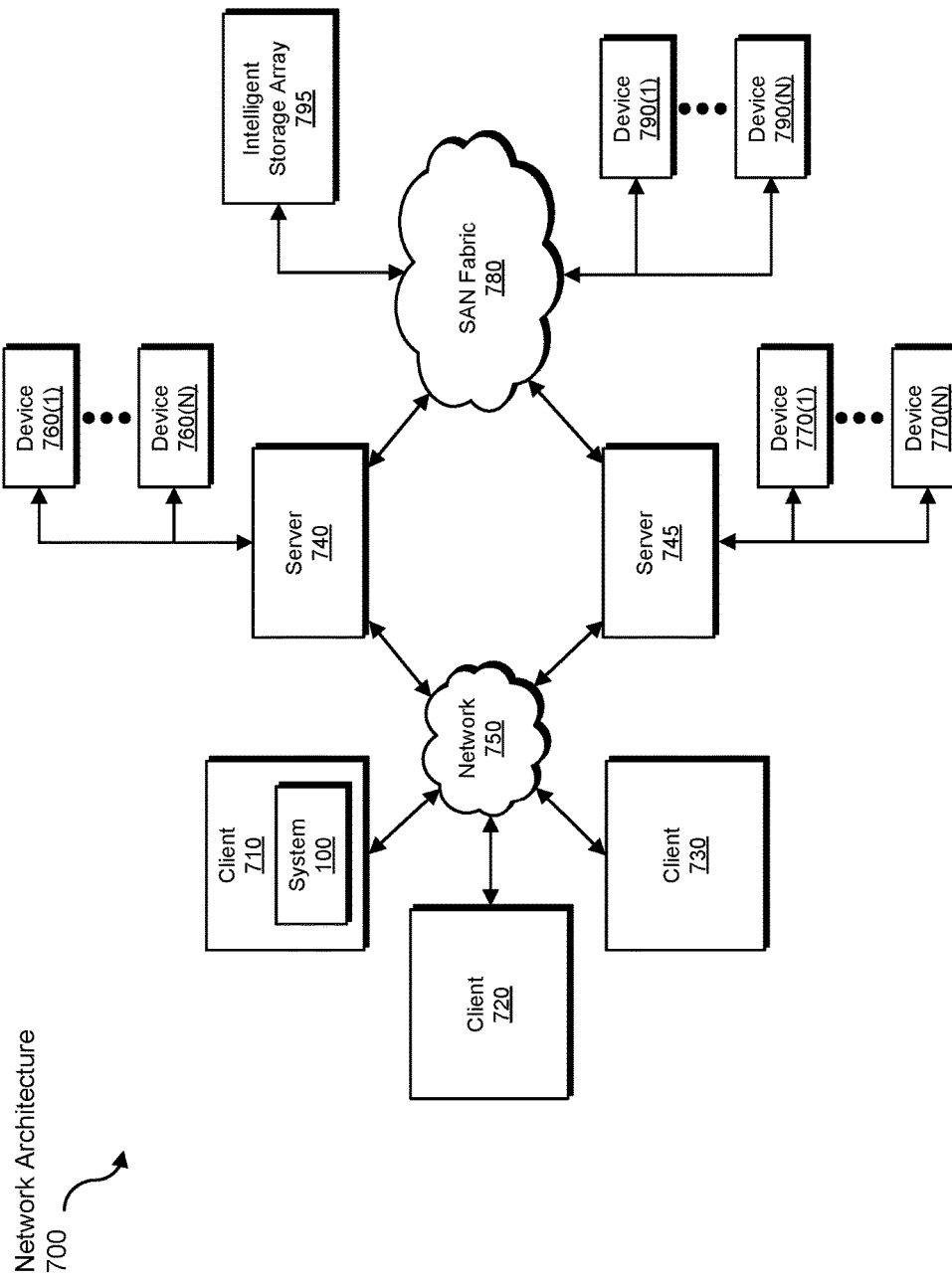
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for profiling client systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive client attribute data to be transformed, transform the client attribute data, output a result of the transformation to estimate an association strength between clients and administrative categories, use the result of the transformation to determine associations between clients and administrative categories, and store the result of the transformation to develop customized administrative actions for the clients. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for profiling client systems, at least a portion of the method being performed by a computing device comprising at least one processor, the method comprising:
    identifying at least one administrative category used to categorize clients according to system profiles of the clients;
    collecting attribute information that associates at least one client attribute with the administrative category;
    generating, based at least in part on the association between the client attribute and the administrative category, an association scoring protocol that estimates an association strength between clients and the administrative category, wherein the association between the client attribute and the administrative category is based on clients previously assigned to the administrative category having the client attribute;
    assigning, based on the association scoring protocol, an association score to at least one client;
    determining, based on the association score being above a threshold, that the client should be associated with the administrative category; and
    initiating at least one customized administrative action for the client, based at least in part by the association of the client with the administrative category.

2. The computer-implemented method of claim 1, wherein collecting attribute information that associates the client attribute with the administrative category comprises:
    identifying at least one client attribute that associates clients with the administrative category;
    assigning, based on the identified client attribute, at least one client to the administrative category;
    identifying additional attribute information associated with the client.

3. The computer-implemented method of claim 1, wherein collecting attribute information that associates the client attribute with the administrative category comprises:
    identifying at least one client attribute that associates clients with the administrative category;
    identifying additional attribute information associated with the client attribute.

4. The computer-implemented method of claim 1, wherein the attribute information comprises at least one of:
    at least one file present on the client;
    at least one process running on the client;
    at least one network connection established by the client;
    data accessed by the client;
    network traffic generated by the client.

5. The computer-implemented method of claim 1, wherein generating the association scoring protocol that estimates the association strength between clients and the administrative category comprises:
 identifying a plurality of clients associated with the administrative category;
 identifying at least one attribute of the plurality of clients that most strongly correlates with membership in the plurality of clients;
 based on the strength of the correlation between the attribute and membership in the plurality of clients, estimating the association strength between the plurality of clients and the administrative category.

6. The computer-implemented method of claim 1, wherein generating the association scoring protocol that estimates the association strength between clients and the administrative category comprises:
 assigning a plurality of clients with at least one common attribute to the administrative category;
 identifying at least one additional attribute of at least one client in the plurality of clients;
 determining a correlation strength between the additional attribute and membership in the administrative category;
 based on the correlation strength between the additional attribute and membership in the administrative category, estimating the association strength between the plurality of clients and the administrative category.

7. The computer-implemented method of claim 6, further comprising identifying an additional administrative category by:
 determining that the additional attribute weakly correlates with membership in the administrative category;
 determining that the additional attribute strongly correlates with membership in a subset of the plurality of clients;
 assigning the subset of the plurality of clients to the additional administrative category.

8. The computer-implemented method of claim 1, wherein the customized administrative action comprises at least one of:
 identifying a trusted application source for the client;
 identifying a trusted application update source for the client;
 modifying at least one client application user interface;
 assigning a security alert policy to the client;
 assigning a data access policy to the client;
 assigning a messaging policy to the client;
 notifying an administrator of the administrative category association for the client.

9. A system for profiling client systems, the system comprising:
 one or more processors; and
 a non-transitory memory, the memory having stored thereon instructions that when executed by the one or more processors cause the system to:
  identify at least one administrative category used to categorize clients according to system profiles of the clients;
  collect attribute information that associates at least one client attribute with the administrative category;
  generate, based at least in part on the association between the client attribute and the administrative category, an association scoring protocol that estimates an association strength between clients and the administrative category, wherein the association between the client attribute and the administrative category is based on clients previously assigned to the administrative category having the client attribute;
  assign, based on the association scoring protocol, an association score to at least one client;
  determine, based on the association score being above a threshold, that the client should be associated with the administrative category; and
  perform at least one customized administrative action for the client, based at least in part by the association of the client with the administrative category.

10. The system of claim 9, wherein the instructions for collecting attribute information that associates the client with the administrative category comprises instructions for:
 identifying at least one client attribute that associates clients with the administrative category;
 assigning, based on the identified client attribute, at least one client to the administrative category;
 identifying additional attribute information associated with the client.

11. The system of claim 9, wherein the instructions for collecting attribute information that associates the client attribute with the administrative category comprises instructions for:
 identifying at least one client attribute that associates clients with the administrative category;
 identifying additional attribute information associated with the client attribute.

12. The system of claim 9, wherein the attribute information comprises at least one of:
 at least one file present on the client;
 at least one process running on the client;
 at least one network connection established by the client;
 data accessed by the client;
 network traffic generated by the client.

13. The system of claim 9, wherein the instructions for generating the association scoring protocol that estimates the association strength between clients and the administrative category comprises instructions for:
 identifying a plurality of clients associated with the administrative category;
 identifying at least one attribute of the plurality of clients that most strongly correlates with membership in the plurality of clients;
 estimating the association strength between the plurality of clients and the administrative category.

14. The system of claim 9, wherein the the instructions for generating the association scoring protocol that estimates the association strength between clients and the administrative category comprises instructions for:
 assigning a plurality of clients with at least one common attribute to the administrative category;
 identifying at least one additional attribute at least one client in the plurality of clients;
 determining a correlation strength between the additional attribute and membership in the administrative category;
 estimating the association strength between the plurality of clients and the administrative category.

15. The system of claim 14, wherein the instructions for identifying an additional administrative category comprises instructions for:
 determining that the additional attribute weakly correlates with membership in the administrative category;

determining that the additional attribute strongly correlates with membership in a subset of the plurality of clients;

assigning the subset of the plurality of clients to the additional administrative category.

16. The system of claim 9, wherein the customized administrative action comprises at least one of:

identifying a trusted application source for the client;

identifying a trusted application update source for the client;

modifying at least one client application user interface;

assigning a security alert policy to the client;

assigning a data access policy to the client;

assigning a messaging policy to the client;

notifying an administrator of the administrative category association for the client.

17. A non-transitory computer-readable medium comprising one or more computer-readable instructions that, when executed by at least one processor of a computing device, cause the computing device to:

identify at least one administrative category used to categorize clients according to system profiles of the clients;

collect attribute information that associates at least one client attribute with the administrative category;

generate, based at least in part on the association between the client attribute and the administrative category, an association scoring protocol that estimates an association strength between clients and the administrative category, wherein the association between the client attribute and the administrative category is based on clients previously assigned to the administrative category having the client attribute;

assign, based on the association scoring protocol, an association score to at least one client;

determine, based on the association score being above a threshold, that the client should be associated with the administrative category; and initiate at least one customized administrative action for the client, based at least in part by the association of the client with the administrative category.

18. The non-transitory computer-readable medium of claim 17, wherein the one or more computer-readable instructions cause the computing device to collect attribute information that associates the client with the administrative category by:

identifying at least one client attribute that associates clients with the administrative category;

assigning, based on the identified client attribute, at least one client to the administrative category;

identifying additional attribute information associated with the client.

19. The non-transitory computer-readable medium of claim 17, wherein the one or more computer-readable instructions cause the computing device to collect attribute information that associates the client attribute with the administrative category by:

identifying at least one client attribute that associates clients with the administrative category;

identifying additional attribute information associated with the client attribute.

20. The non-transitory computer-readable medium of claim 17, wherein the one or more computer-readable instructions cause the computing device to collect attribute information comprising at least one of:

at least one file present on the client;

at least one process running on the client;

at least one network connection established by the client;

data accessed by the client;

network traffic generated by the client.

* * * * *

UNITED STATES PATENT AND TRADEMARK OFFICE
CERTIFICATE OF CORRECTION

PATENT NO. : 10,057,274 B1
APPLICATION NO. : 15/087623
DATED : August 21, 2018
INVENTOR(S) : Kevin Alejandro Roundy et al.

Page 1 of 1

It is certified that error appears in the above-identified patent and that said Letters Patent is hereby corrected as shown below:

In the Claims

In Column 20, Line 50, in Claim 14, delete "wherein the the instructions" and insert -- wherein the instructions --, therefor.

Signed and Sealed this
Fifth Day of March, 2019

Andrei Iancu
*Director of the United States Patent and Trademark Office*